(12) United States Patent
Prince et al.

(10) Patent No.: US 12,152,176 B2
(45) Date of Patent: Nov. 26, 2024

(54) ADHESIVE TAPE ROLL

(71) Applicant: Preston Technical Limited, Blackburn (GB)

(72) Inventors: Derek Prince, Chorley (GB); Michael Baron Oliver, Blackburn (GB); Lee Brian Parnell, Bolton (GB)

(73) Assignee: PRESTON TECHNICAL LIMITED, Blackburn (GB)

( * ) Notice: Subject to any disclaimer, the term of this patent is extended or adjusted under 35 U.S.C. 154(b) by 0 days.

(21) Appl. No.: 17/596,866

(22) PCT Filed: Jun. 26, 2020

(86) PCT No.: PCT/GB2020/051556
§ 371 (c)(1),
(2) Date: Dec. 20, 2021

(87) PCT Pub. No.: WO2020/260896
PCT Pub. Date: Dec. 30, 2020

(65) Prior Publication Data
US 2022/0306907 A1 Sep. 29, 2022

(30) Foreign Application Priority Data

Jun. 28, 2019 (GB) .................................. 1909356

(51) Int. Cl.
*C09J 7/38* (2018.01)
*C09J 7/20* (2018.01)

(52) U.S. Cl.
CPC .............. *C09J 7/38* (2018.01); *C09J 7/203* (2018.01); *C09J 2301/124* (2020.08); *C09J 2301/18* (2020.08); *C09J 2301/204* (2020.08)

(58) Field of Classification Search
CPC .............. C09J 2301/124; C09J 2301/18; C09J 2301/204; C09J 7/203; C09J 7/30; C09J 7/38; Y10S 428/906; Y10T 428/14; Y10T 428/187; Y10T 428/28
See application file for complete search history.

(56) References Cited

FOREIGN PATENT DOCUMENTS

| DE | 2909276 A1 | 9/1980 |
|----|----|----|
| DE | 19721169 A1 | 11/1998 |
| JP | 56-151345 U | 11/1981 |
| JP | 09-208908 A | 8/1997 |
| JP | 09-208909 A | 8/1997 |
| JP | 2015-098551 A | 5/2015 |
| KR | 200425967 | 9/2006 |

(Continued)

OTHER PUBLICATIONS

Written Opinion of PCT/GB2020/051556.*

(Continued)

*Primary Examiner* — Sonya M Sengupta
(74) *Attorney, Agent, or Firm* — Hamilton, Brook, Smith & Reynolds, P.C.

(57) ABSTRACT

Embodiments of the present techniques provide an adhesive tape roll that comprises a plurality of detachable segments. The detachable segments comprise a pull tab to help separate a protective liner layer, or backing layer/backing liner, from the adhesive tape at the point of use. Thus, a user may detach a segment from the roll, and then use the pull tab to separate the adhesive tape from the backing liner.

12 Claims, 3 Drawing Sheets

(56) References Cited

FOREIGN PATENT DOCUMENTS

| KR | 20140010280 A | 1/2014 |
|---|---|---|
| WO | 0114489 A1 | 3/2001 |
| WO | 2020260896 A1 | 12/2020 |

OTHER PUBLICATIONS

Korean Office Action issued in Application 10-2022-7003288, dated Apr. 27, 2022.
PCT International Search Report and Written Opinion for International Application No. PCT/GB2020/051556, entitled "Adhesive Tape Roll," mailed on Sep. 3, 2020.

* cited by examiner

ADHESIVE TAPE ROLL

This application is the U.S. National Stage of International Application No. PCT/GB2020/051556, filed Jun. 26, 2020, which designates the U.S., published in English, and claims priority under 35 U.S.C. § 119 or 365(c) to Great Britain Application No. 1909356.6, filed Jun. 28, 2019. The entire teachings of the above applications are incorporated herein by reference.

TECHNICAL FIELD

The present techniques generally relate to an adhesive tape roll, and in particular relate to an adhesive tape roll for dispensing pieces of adhesive tape.

BACKGROUND

Adhesive tape for specific industrial applications may be provided in pre-cut lengths that are carried on a paper or plastic film carrier. This enables the correct length of tape to be applied for a job of adhering. For a user of the tape this is generally easier than measuring and dispensing the tape from a roll, as it is difficult to dispense a required length from the roll with high accuracy, and it may be difficult to find the end of the tape on the roll to begin the dispensing process. Although using pre-cut lengths of tape may be helpful for enabling the correct length of tape to be applied for a job, it has the disadvantage of requiring the carrier to be produced and stuck to the tape, and disposed of after the tape has been used. Furthermore, when a tape user requires multiple tape pieces of different pre-cut lengths for a multi-part job there is a problem of identifying and organising the pre-cut lengths. For double sided tapes, the use of pre-cut lengths requires consideration to be given to separating the adhesive tape from a backing liner.

The present applicant has identified an improved technique for dispensing adhesive tape to address these problems.

SUMMARY

In a first approach of the present techniques, there is provided an adhesive tape roll comprising: a backing liner divided into a plurality of detachable segments, the detachable segments of the backing liner defined between divisions provided in the backing liner, the detachable segments comprising a tape-carrying portion and a tab portion; wherein the tape-carrying portions carry an adhesive tape segment; and wherein the tab portions comprise a tab for separating the tape-carrying portion of the detachable segment of backing liner from the adhesive tape segment carried thereon.

In a second approach of the present techniques, there is provided a method of manufacturing an adhesive tape roll, the method comprising: providing an adhesive tape on a backing liner; defining a plurality of detachable segments of backing liner by providing divisions in the backing liner, dividing the adhesive tape to form an adhesive tape segment on each of the detachable segments of the backing liner; removing a section of adhesive tape from the adhesive tape segments to leave, for each of the detachable segments of the backing liner, a tab portion and a tape-carrying portion, the tape-carrying portion carrying an adhesive tape segment and the tab portion comprising a pull tab for separating the tape-carrying portion of the detachable segment from the adhesive tape segment; and forming the backing liner and adhesive tape segments into a roll.

According to the present techniques there are provided an adhesive tape roll and a method as set forth in the appended claims. Other features of the invention will be apparent from the description which follows.

INTRODUCTION TO DRAWINGS

Implementations of the present techniques will now be described, by way of example only, with reference to the accompanying drawings, in which.

DESCRIPTION OF EMBODIMENTS

Broadly speaking, embodiments of the present techniques provide an adhesive tape roll that comprises detachable segments. The detachable segments are easy to remove from the roll, and comprise a pull tab to help separate a backing backing liner from the adhesive tape at the point of use. Thus, a user may detach a segment from the rest of the roll, and then use the pull tab to separate the adhesive tape from the backing liner. The pull tab may also be useful in separating the segment from the roll. Segments of different lengths may be formed on a single roll, to facilitate use of the tape in jobs that require different specific pieces of tape. No separate carrier paper is required for the segments, with the backing liner on the roll serving to keep the rolled segments from adhering to one another and protecting the adhesive tape up to the point of use. Thus, the present techniques improve the ease of application of the tape, and reduce waste.

Figure 1:
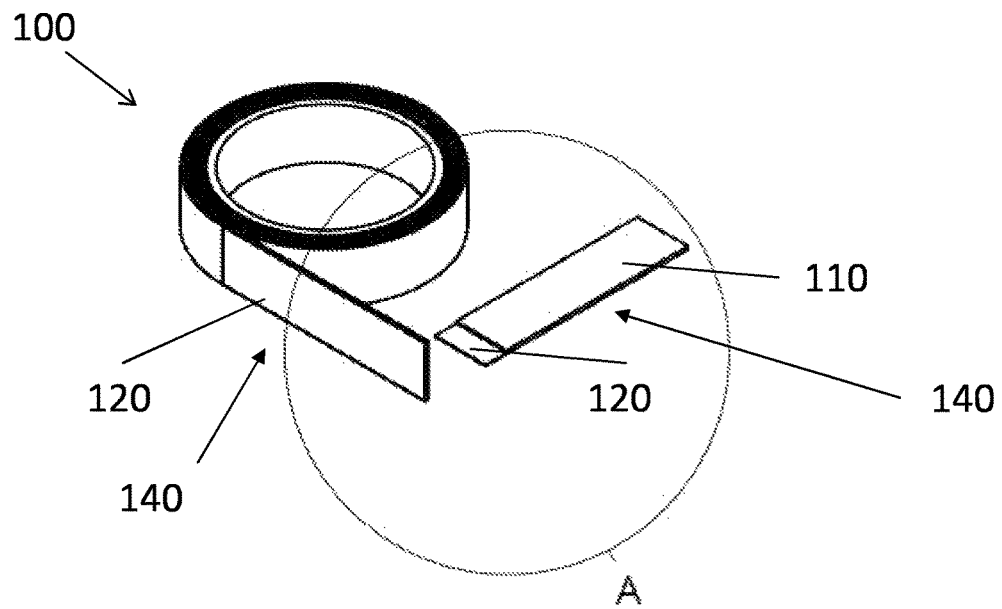
FIG. 1A shows an adhesive tape roll and FIG. 1B shows a zoomed-in view of the adhesive tape roll.
Figure 1:
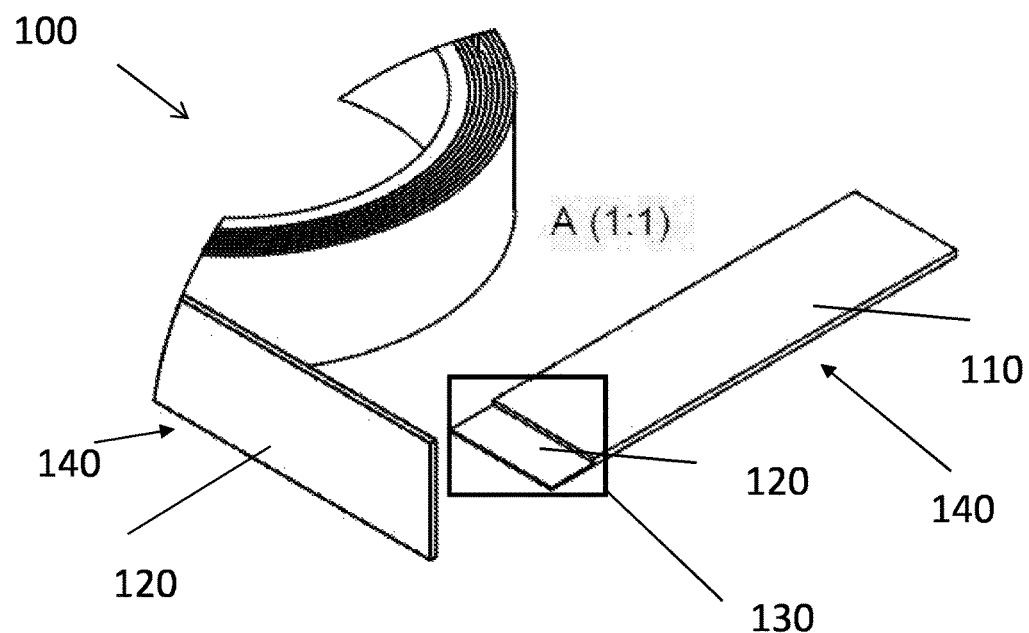

FIG. 1A shows an adhesive tape roll 100 which has been provided on a core 101, and FIG. 1B shows a zoomed-in view of the adhesive tape roll 100. It will be understood that the adhesive tape roll 100 could be provided without a separate core 101 to support the interior thereof.

The adhesive tape roll 100 comprises an adhesive tape 110 and a backing liner layer 120. The backing liner layer 120 separates the adhesive surfaces of the adhesive tape 110 on the roll from one another. The adhesive tape roll 100 comprises a plurality of detachable segments 140. In the example shown, the detachable segments 140 are of equal length to one another. One segment 140 is shown in FIGS. 1A and 1B after detachment from the adhesive tape roll 100, and another segment 140 is shown as still being attached to the adhesive tape roll 100. Each segment 140 comprises backing liner and adhesive tape. Each segment is defined by divisions, which are for example provided as a built-in line or point of weakness in the backing liner. The built-in line or point of weakness can be formed as perforations, as described in more detail below, or in other ways such as scoring, laser cutting, heat or ultrasound etc. In some example embodiments the divisions may comprise a separation in the backing liner layer 120.

In one example, perforations across the width of the adhesive tape product define the segments, such that each segment may be easily dispensed by detaching or tearing the segment from the rest of the roll. In other embodiments the segment may be scored, laser cut or otherwise partially or completely separated from the next at the divisions. Each segment 140 comprises a tape-carrying portion and a tab portion. The tape-carrying portion comprises backing liner and adhesive tape. The tab portion comprises only backing liner, for example a portion of the backing liner from which an associated section of the adhesive tape has been removed during manufacture of the roll 100. In this way, the second portion forms a pull tab 130 which enables a user to grip onto the backing liner to separate the adhesive tape from the backing liner. In embodiments where a pull tab is provided at the free end of the segments, such as on the outside of the roll, the pull tab may aid the user to detach the segment from the rest of the roll 100. In other example embodiments a tab portion may be provided at each end of the segment.

The adhesive tape 110 of the adhesive tape product may be, for example, a pressure sensitive adhesive tape. The adhesive tape 110 may comprise and oil-based substrate. The tape may comprise a foamed adhesive such as acrylic foam tape. The adhesive tape 110 may be a die-cut and/or self-adhesive tape. The adhesive tape may be a single or double-coated adhesive tape. The adhesive on the surface or surfaces of the adhesive tape 110 may be any adhesive which is used in tapes, e.g. cellophane, acrylic adhesives, epoxy resins, rubber-based adhesives such as butadiene-styrene, butyl, polyisobutylene or nitrile compounds, silicone adhesives, polyurethane and isocyanate adhesives. The backing liner layer 120 may be made of any suitable material, such as cloth, paper, metal foil, plastic film, felt, foam, PET/polyester, polyimide, PVC/vinyl, rubber, glass, fibreglass, rubber, filament, fluoropolymer, or synthetic resins.

Figure 2:
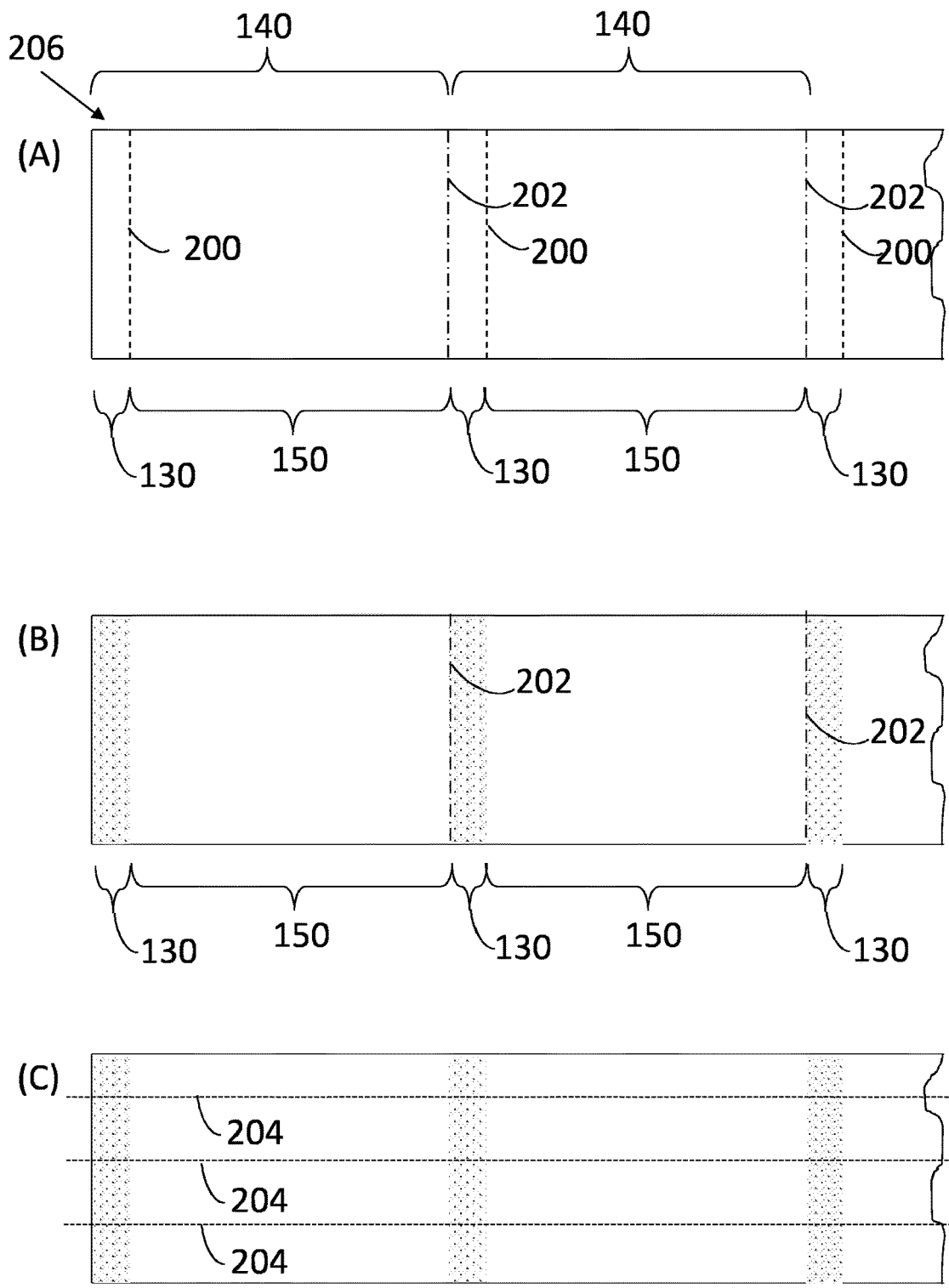
FIGS. 2A to 2C illustrate steps to form an adhesive tape roll.

FIGS. 2A to 2C illustrate steps to form the adhesive tape roll according to the present techniques. The method starts with adhesive tape provided on a layer of backing liner. Typically this is supplied on a roll in the form of a composite two-layer product. The backing liner layer is provided over an adhesive surface of the adhesive tape layer when the two-layer product is unrolled to be processed in the further method steps. From the composite two-layer product 206, the backing liner is divided into a plurality of detachable segments 140. FIG. 2A shows two detachable segments 140 formed in the composite two-layer product 206. The segments 140 are defined by divisions 202 extending across a width of the composite two-layer product 206. The divisions comprise perforations 202 formed along a width of the composite two-layer product 206 through both the adhesive tape layer and the backing liner layer. In this example the divisions are provided at equally spaced intervals, but as will be appreciated this is not a requirement. Likewise, the degree of division of the adhesive tape layer and backing liner layer need not be the same.

Each detachable segment 140 has a tape-carrying portion 150 and a tab portion 130. The composite two-layer product 206 is further processed to form a plurality of adhesive tape segments, where each adhesive tape segment is provided on the tape-carrying portion 150 of a detachable segment 140 by first the adhesive tape layer at intervals 200, and then removing the adhesive tape layer from the tab portion 130 of each detachable segment 140. Cutting the adhesive tape layer may comprise kiss-cutting the adhesive tape layer, such that along cuts 200 the backing liner layer is not cut but the adhesive tape layer is cut. In one example the adhesive tape layer may be completely cut, whereas the backing liner layer provided with a built-in weakness only. In other examples both layers may be completely cut.

In other words, the piece of adhesive tape which is initially in the tab portion 130 of each detachable segment 140 is removed from the tab portion 130. Accordingly, the tape-carrying portion 150 of each detachable segment 140 comprises both adhesive tape and backing liner, while the tab portion 130 comprises only the backing liner once the adhesive tape has been removed from this area. The tab portion 130 forms a pull tab for separating the adhesive tape segment from the backing liner, and in addition may be useful for detaching the detachable segment 140 from a roll.

FIG. 2B shows the composite two-layer product 206 once the adhesive tape has been removed from the product 206, from the second portion 130 of each detachable segment. The perforations 202 also define each detachable segment 140.

FIG. 2C shows how an optional further processing step. In some cases, the width of the product shown in FIG. 2B may be large. For example, the adhesive tape and backing liner layers may be sheets of 56-inch width and 900-yard length. In this case, it may be useful to provide the final adhesive tape product 100 in more smaller sizes. Thus, once the cutting, and perforating steps have been performed, and portions of adhesive layer have been removed, the large sheets of adhesive tape layer and backing liner layer may be formed into a roll. The roll may be as wide as the sheet, or the sheet may be divided width-wise into rolls of smaller predetermined widths. For example, the width may be 48 mm wide. Dividing the width may comprise cutting 204 through the adhesive tape layer and the backing liner layer after the adhesive tape layer has been removed from the second portion of each detachable segment, as shown in FIG. 2C. The cut lines 204 are indicated in FIG. 2C.

The forming of a roll suitably comprising winding around a core, for example a core of corresponding width, as shown in FIGS. 1A and 1B, or alternatively the wide sheet of product shown in FIG. 2B may be wound onto a core to form a roll, and the wide roll subsequently cut into rolls of smaller width. As will be appreciated, although tapes of equal width are illustrated in FIG. 2C, a single wide sheet or roll may be cut into tapes of various widths.

It will be understood that the cuts 200 and perforations 202 may be formed when the composite two-layer product 206 is fed through a machine, such that the product 206 first passes through a cutting tool which forms a first cut 200, then is moved through a perforating tool which forms a first perforation 202, then passes through a cutting tool to form a second cut 200 and so on. In other words, it may not be necessary to first pass the entire product 206 through a cutting tool, and then feed the entire product 206 through a perforating tool. Rather, both the cutting and perforating may be performed using a single machine and by feeding the product 206 through the machine once.

Figure 3:
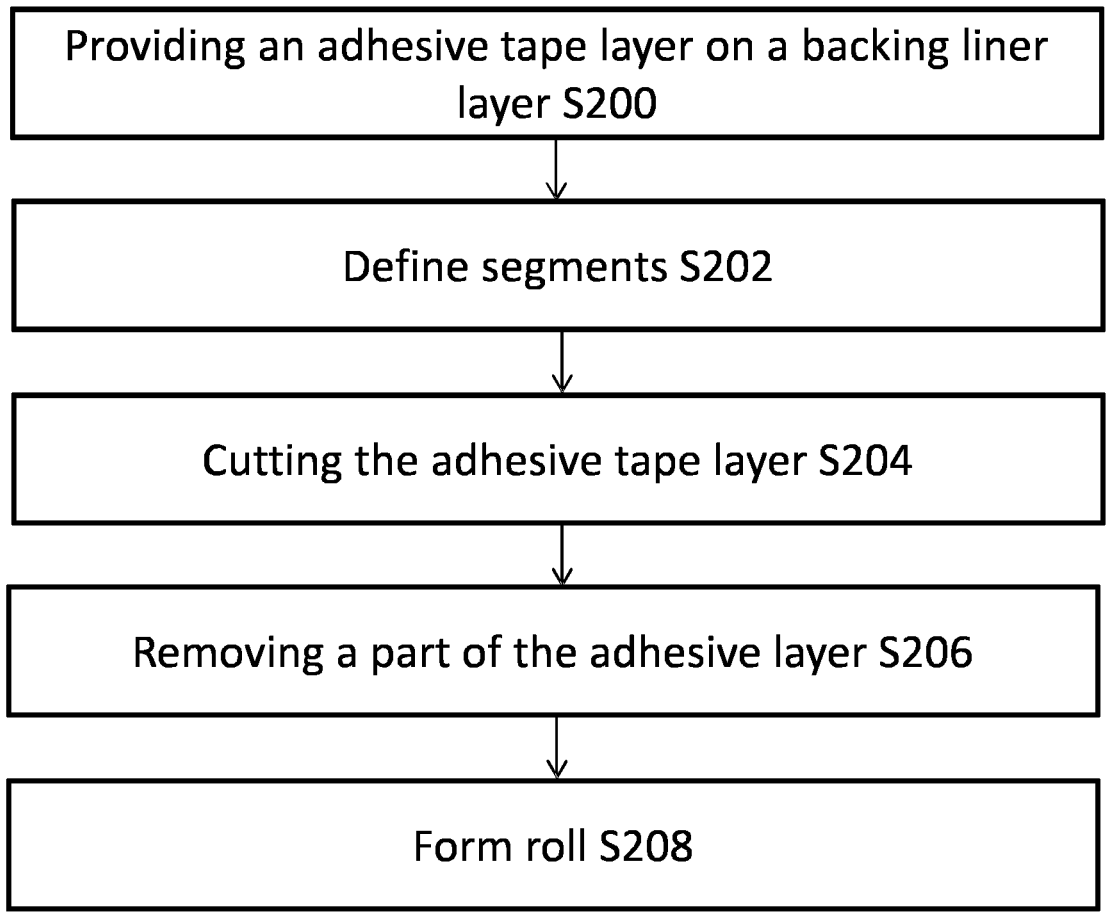
FIG. 3 shows a flowchart of example steps to form an adhesive tape roll.

FIG. 3 shows a flowchart of example steps to form the adhesive tape roll. The process begins by providing an adhesive tape layer on a backing liner layer (step S200), in the form of a composite two-layer product. The two-layer product is divided (step S202) to define a plurality of detachable segments. Each detachable segment has a tape-carrying portion and a tab portion. The divisions may comprise perforations that go through both the adhesive tape layer and the backing liner layer. The adhesive layer only is then cut at intervals (step S204). The cuts in this example embodiment are made at a distance away from the divisions in the backing liner layer, as shown in FIG. 2A. The cuts are made to enable a part of the adhesive tape layer to be detached from the detachable segment to form the tape-carrying portion and the tab portion. The part of the adhesive layer which is in the tab portion is removed from the backing liner (step S206). Accordingly, the tab portion does not carry adhesive tape, but forms a pull tab for separating the adhesive tape segment from the backing liner. The product is then formed onto a roll (step S208).

In the method steps S202 through S206 may be performed a plurality of times before step S208 is performed, for example to define segments along the whole length of the two-layer product that is provided in step S200.

In the method, the steps S204 and S206 may be performed more than once within the segment defined at step S202. That is, the tape-carrying portion may be formed to include a section, or more than one section, that does not carry tape, but which is away from a tab portion. In such embodiments, the tape-carrying portion can be thought of as carrying a piece of tape with one or more gaps or discontinuities within its length. Furthermore, the steps S204 and S206 may be performed twice once within the segment defined at step S202 such that a tab portion is formed at both ends of the backing liner layer for the segment.

The method may optionally comprise a further step of cutting the roll across its width, to form two separate narrower rolls, or three or more such rolls.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

Attention is directed to all papers and documents which are filed concurrently with or before this specification in connection with this application and which are open to public inspection with this specification, and the contents of all such papers and documents are incorporated herein by reference.

All the features disclosed in this specification (including any accompanying claims, abstract and drawings), and/or all the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of manufacturing an adhesive tape roll, the method comprising:

providing a composite tape comprising an adhesive tape on a backing liner;

defining a plurality of detachable segments of the composite tape by:

providing divisions in the backing liner; and dividing the adhesive tape to form an adhesive tape segment on each of the detachable segments of the composite tape;

removing a section of adhesive tape from the adhesive tape segments to leave, for each of the detachable segments of the composite tape, a tab portion and a tape-carrying portion, the tape-carrying portion carrying an adhesive tape segment and the tab portion comprising a pull tab for: (i) detaching the detachable segment of the composite tape and (ii) separating the tape-carrying portion of the detachable segment from the adhesive tape segment; and forming the plurality of detachable segments of the composite tape into a roll.

2. The method of claim 1, wherein providing an adhesive tape on a backing liner comprises providing a double-sided adhesive tape.

3. The method of claim 1, wherein defining a plurality of detachable segments comprises providing divisions at predetermined intervals along a length of the tape.

4. The method of claim 1, wherein defining a plurality of detachable segments comprises providing divisions in the form of built-in lines or points of weakness.

5. The method of claim 1, wherein defining a plurality of detachable segments comprises providing divisions in the form of built-in lines or points of weakness across the width of the backing liner.

6. The method of claim 1, wherein dividing the adhesive tape comprises cutting through the tape.

7. The method of claim 1 wherein one of the divisions in the backing liner is provided to coincide with position of an end of the adhesive tape segment on the detachable segments of the backing liner.

8. The method of claim 1 wherein forming into a roll is performed with the pull tabs of the detachable segments arranged toward an end of the roll from which the detachable segments may be detached.

9. The method of claim 1 wherein forming into a roll is performed with the pull tabs of the detachable segments arranged toward a free end of the tape on an outer end of the roll.

10. The method of claim 1 further comprising dividing a roll of the composite tape into a plurality of rolls having a width smaller than the roll.

11. The method of claim 1, wherein defining a plurality of detachable segments of the composite tape comprises forming perforations along a width of the composite tape through both the adhesive tape and the backing liner.

12. The method of claim 1, wherein the pull tab is additionally for detaching the detachable segment of the composite tape from a roll of the composite tape.

* * * * *